Feb. 21, 1939.  J. L. PERKINS  2,147,919
MACHINE FOR FORMING WORMS AND THE LIKE
Filed Aug. 5, 1937  2 Sheets-Sheet 1
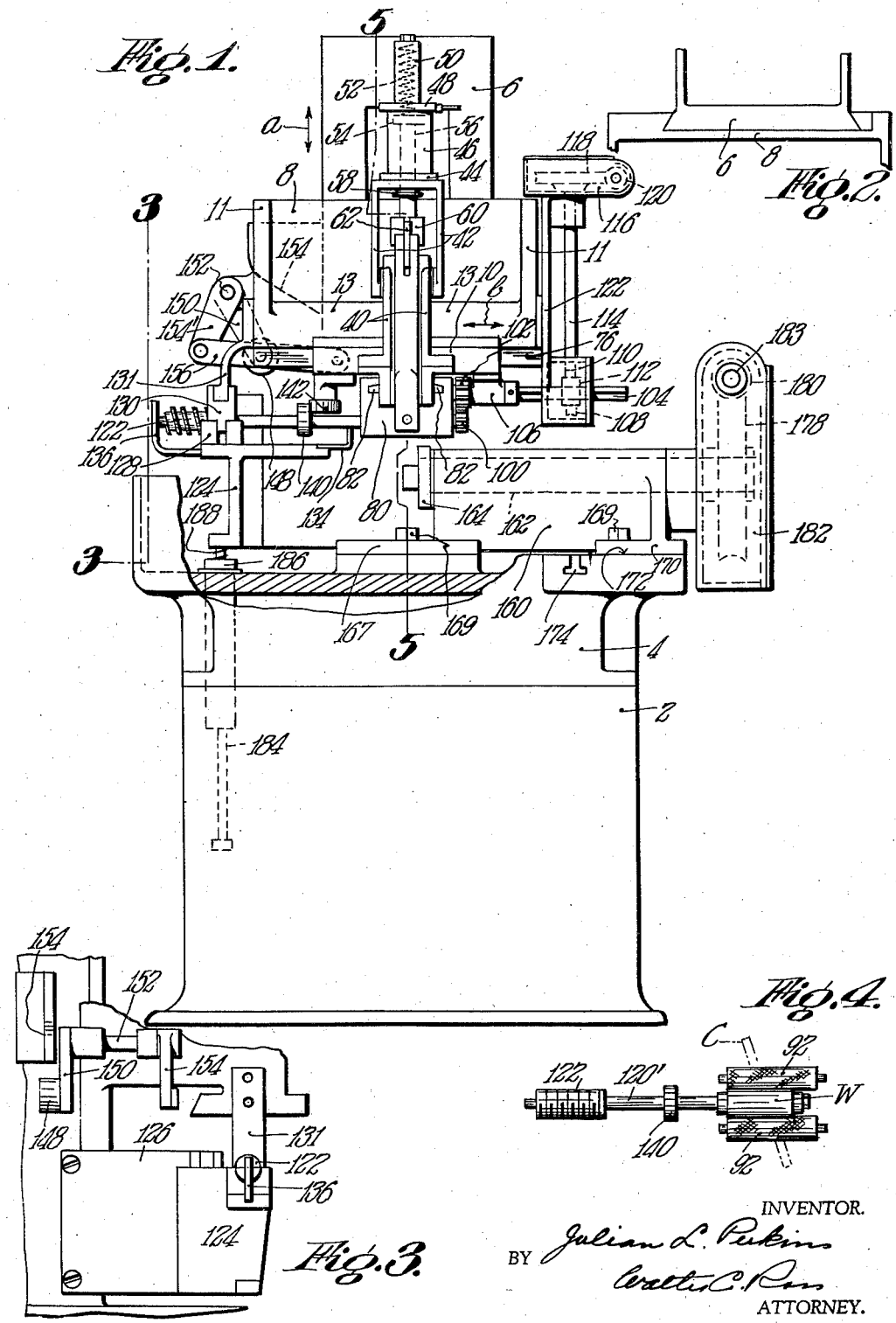
INVENTOR.
BY Julian L. Perkins
Walter C. Ross
ATTORNEY.

Feb. 21, 1939.   J. L. PERKINS   2,147,919
MACHINE FOR FORMING WORMS AND THE LIKE
Filed Aug. 5, 1937   2 Sheets-Sheet 2

INVENTOR.
Julian L. Perkins
Walter C. Ross.
BY
ATTORNEY.

Patented Feb. 21, 1939

2,147,919

UNITED STATES PATENT OFFICE 2,147,919

MACHINE FOR FORMING WORMS AND THE LIKE

Julian L. Perkins, West Springfield, Mass.

Application August 5, 1937, Serial No. 157,581

16 Claims. (Cl. 90—20)

This invention relates to improvements in machine tools and is directed more particularly to machines wherein a piece of work is rotated so as to be operated on by a tool.

The principal objects of the invention are directed to the provision of a machine tool which is characterized by means for peripherally supporting work which is operated upon by a tool in combination with means for feeding the work and tool relative to one another.

In the forming of worms or screws having single or multiple threads, it is customary to rotate the work on centers or an arbor, the cutter acting on the periphery. Under the best conditions the pressure of the tool springs the arbor or the work making it necessary to leave considerable stock on the work for grinding and finishing operations.

When a relatively heavy cut is being taken, the work is sprung off center more than when a relatively slighter cut is taken so that in order to reduce the springing and the necessary grinding resulting therefrom the cut is reduced. As a consequence the cut is not as great as could be but in any event there must be considerable stock left for the grinding all to the end that worms and screws are more expensive than when formed by means of the machine of this invention.

According to the invention of the present application, the work is peripherally supported for rotation, in such a way that springing is entirely eliminated. Therefore, it is possible to take a cut which is decidedly greater than it has been possible heretofore. By reason of the fact the springing has been eliminated, very little stock is left for the grinding and finishing operations.

Worms, screws, and the like may be produced in much less time and at much less cost than formerly, it being possible to speed up the cutting and grinding operations.

The invention in its present preferred form will be described in connection with the machine for cutting or forming worms, screws and other objects having spirally arranged threads, grooves or ridges but it will be appreciated that various changes and modifications may be made to adapt the machine for various purposes without departing from the spirit or scope of the invention.

In the drawings—

Fig. 1 is a front elevational view of a machine embodying the novel features of the invention;

Fig. 2 is a fragmentary plan view of the upper part of the machine shown in Fig. 1 to explain certain features of the invention;

Fig. 3 is a partial side elevational view on the line 3—3 of Fig. 1;

Fig. 4 is a more or less diagrammatic plan view to explain the means for peripherally supporting the work.

Figure 5:
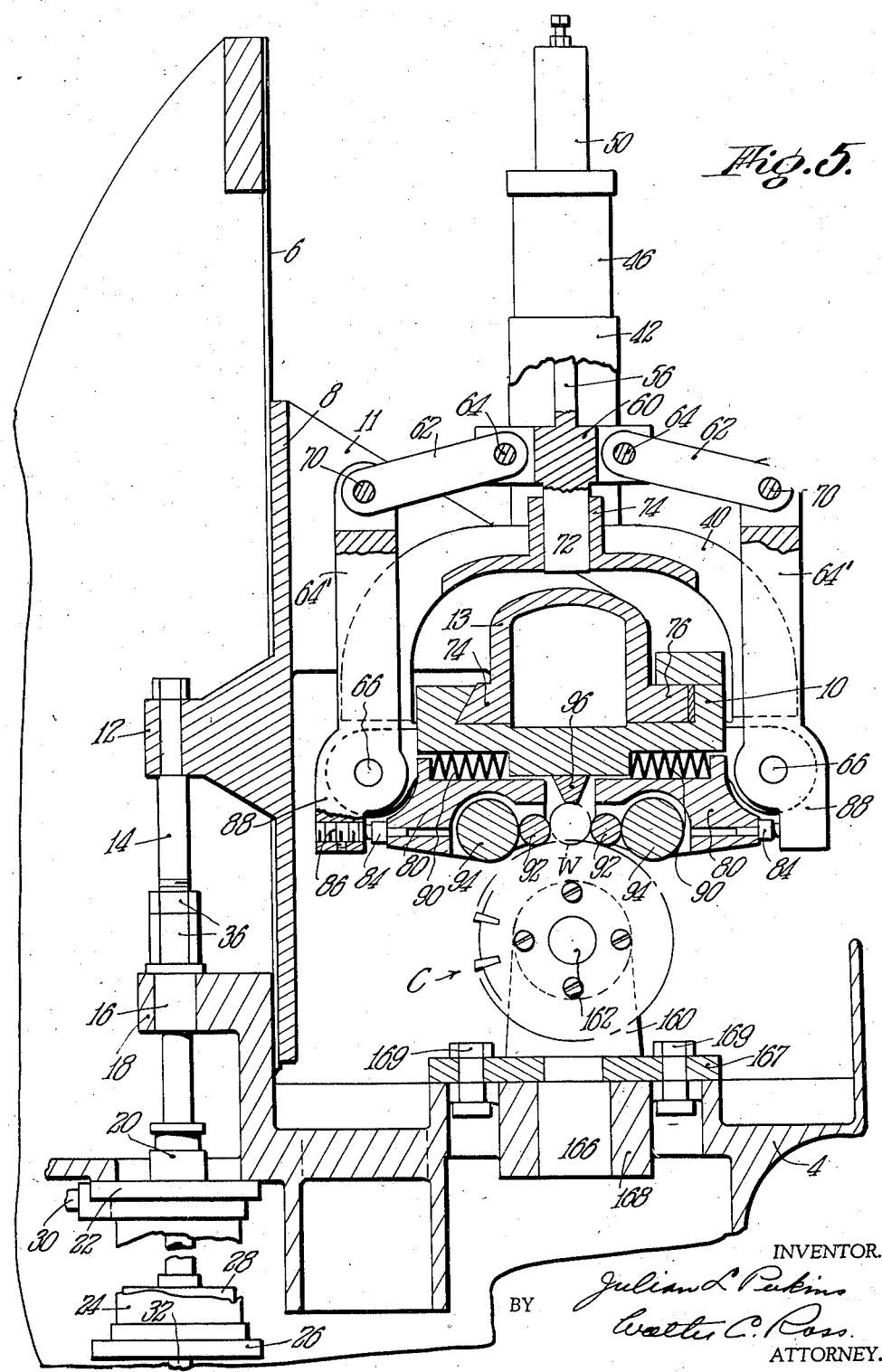
Fig. 5 is an enlarged sectional elevational view on line 5—5 of Fig. 1.

Referring now to the drawings in detail the invention will be fully described.

The machine in Fig. 1 has a lower base part 2 and an upper bed part 4 having a vertical guideway 6 extending upwardly therefrom at the rear side thereof on which there is slidable in the direction of arrow $a$ a vertical slide 8. A cross slide 10 is slidable back and forth in the direction of the arrow $b$ on the vertical slide 8.

The vertical slide moves up and down so as to bring the means for peripherally engaging the work into and out of engagement with the work and the cross slide moves back and forth engaging the work to move the work or blank relative to a tool.

The slide 8 (see Fig. 5) has a boss 12 in which is fixed the end of a rod 14. The said rod passes through a bearing or bushing 16 carried by a boss 18 of the bed 4 and through a stuffing box 20 associated with a cylinder head 22 at the upper end of a cylinder 24, there being a lower head 26 at the lower end of the cylinder. A piston 28 on the rod 14 is reciprocable in the cylinder. Pipes or connections 30 and 32 associated with the cylinder heads are provided for fluid which may act on the piston to move the vertical slide 8 up and down. Nuts threadedly engaging rod 14 are provided to limit the lowermost position of the rod 14 and thereby the vertical slide.

Uprights 40 carried by the cross slide 10 have their upper ends secured to depending portions 42 of a lower cylinder head 44. A cylinder 46 on the head 44 has an upper head 48 provided with an inverted well 50. A spring 52 in the said well acts on a piston 54 having a rod 56 which passes through a stuffing box 58 associated with the lower head 44.

A cross-head 60 is carried by the rod 56 and links 62 are pivoted at 64 to the cross-head. Arms 64' are pivoted at 66 to the cross slide 10 and their upper ends are slotted to receive the ends of the links 62 which are pivoted thereto at 70. A pilot 72 on the cross head is reciprocable in a bearing 74 associated with the members 40.

The vertical slide 8 has side webs 11 between which is a cross member 13 and the slide 10 is slidable on parts 74 and 76 associated with this cross member 13. Roll carriers indicated generally by 80 are guided for reciprocation towards and away from one another by guides 82 associated with a cross slide 10.

These carriers have pilots such as 84 and screws such as 86 in lower extensions of arms 64' are adapted to bear on said pilots. When piston 54 is moved downwardly in the cylinder 42 by means of the spring 52 the upper ends of the arms 64' are moved outwardly by links 62 and the lower ends of arms are moved inwardly so that the screws act on the pilots to move the member 80 inwardly toward one another against springs 90 disposed between abutments on the members 80 and slide 10, as shown clearly in Fig. 5. When the cross head 60 moves upwardly the springs act to separate the members 80 or move them outwardly. Work engaging rolls 92 are mounted for rotation in the members 80 as are rolls 94. The said rolls 92 are arranged when the members 80 are moved inwardly to peripherally engage a piece of work such as for instance a worm blank indicated by W. A shoe is carried by the slide 10 above the work and is indicated by 96. This shoe serves as an abutment for the work W which is peripherally engaged and rotated by the rolls 92. The rolls 94 serve to back up the rolls 92 and exert pressure thereagainst when the members 80 are moved inwardly by the arms 64 whereby the work is peripherally engaged at its opposite sides under considerable pressure to hold it against shifting while it is rotated by the rolls 92 for the action of a tool. Gears 100 associated with the rolls 92 are in mesh with a gear 102 fixed on a shaft 104, rotatable in a bearing 106.

The shaft 104 may be rotated in various ways but as an illustration the said shaft and a worm gear 108 in a case 110 are relatively slidable. Gear 108 is in mesh with a worm 112 on a vertical shaft 114. The upper end of the shaft 114 is rotatable in a box 116 and it carries a worm 118 in mesh with a worm 120. The boxes 110 and 116 are supported by a bracket 122 associated with the vertical slide 8. The upper worm 120 is rotated to rotate worm gear 108 and the shaft 104 may slide back and forth in the worm gear 108 as the carriage 10 moves back and forth on the vertical carriage.

The work W is supported on the end of a mandrel 120' on which is a master worm 122 which corresponds to the worm it is desired to form from the work or blank W. A bracket 124 is slidable up and down on a plate 126 secured to the guide 6 and it carries a lower half 128 of a nut, the upper half 130 of which is carried by a bracket 131 fixed to the vertical slide 8.

The half nuts are provided with a thread to fit that of the master 122. A support 134 is provided on bracket 124 to support mandrel 120' with the master 122 resting in the lower half nut 128 and its end against a stop 136 on bracket 124. The work is thus located in a proper position with the vertical slide 8 in its upper position and when the vertical silde is lowered so that the rolls 92 are disposed at either side of the work while the master is embraced by the half nuts.

As the vertical slide comes to rest in its lower position with rolls 92 at opposite sides of the work the members 80 are moved inwardly so that the said work is peripherally engaged thereby for rotation.

As the work is rotated, the master feeds forwardly in the half nuts so as to feed the work forwardly. To insure that the work is fed forwardly while it is being peripherally supported and rotated there is a collar 140 on the mandrel 120 which acts on a roll 142 of the carriage 10. Therefore, as the master screws itself forwardly and moves the member 120 and work forwardly the collar 140 acts on the roll 142 to move the cross slide. Thus the work is positively fed forwardly while it is being peripherally supported and rotated.

When the vertical slide moves upwardly the cross slide is moved to the left to a starting position. This is accomplished by a roller 148 on a lever 150 which is fixed to a shaft 152 rotatable in the vertical slide 8.

As the vertical slide moves upwardly the roll 148 brings up against a cam 154 associated with guide 6 whereby the lever 150 is swung clockwise. A lever 154' is connected by a link 156 to the cross slide 10 whereby it is moved to the left.

A bearing bracket 160 carries a shaft 162 which is provided with a forward plate 164 to which may be clamped or secured a tool such as a cutter C, shown in Fig. 5. A stud 166 of a flange 167 of the bracket 160 is rotatable in a bearing 168 of the bed 4 and a foot 170 of the bracket rests on a pad 172 of the said bed.

The bed is provided with T slots such as 174 so that the bearing may be swung and secured to the base in various positions of adjustment by means of bolts 169 so as to locate the tool at some desired angle with reference to the axis of the work or blank as illustrated diagrammatically in Fig. 4.

The shaft 162 may be driven in various ways but in the form of the invention shown it carries a worm wheel 178. A worm 180 in mesh therewith is rotatable in a casing 182, and a shaft 183 therefor may be rotated in any desired manner.

A rod 184 is secured to the bracket 124 and is slidable in a socket 186 associated with the base 4. A spring 188 in the socket exerts upward pressure against the member 124. When the master 122 and its shaft have been placed so that the master is in the lower half nut and the vertical slide lowers so that the upper half nut bears on the lower half nut the bracket 124 yields or is depressed against the action of the spring. Depending on the diameter of the work the lowermost position of the vertical slide is variable but the bracket 124 yields so that at all times the half nuts properly embrace the master.

In operation the vertical slide is elevated and the master and the mandrel carrying the work are located so that the master is in the lower half nut with the blank in such a position that it may be engaged by the rolls 92. In the elevated position of the vertical slide the cross-slide is in its position to the left.

With the master, mandrel and blank positioned in the extreme left position the vertical slide is lowered, the upper half nut bears on the lower half nut so that the master is embraced thereby and the rolls 92 disposed at opposite sides of the blank are moved inwardly so as to peripherally engage the same and force it against member 96.

The shaft 104 is rotated so as to rotate rolls 92 which cause the blank to be rotated. As the blank is rotated the master is rotated thereby through the mandrel so that the master screws itself through the half nuts advancing the work relative to the tool.

When the work or blank has been advanced the desired distance, the piston 54 is operated to cause the blank to be released by rolls 92, the vertical slide elevates, during which the cross-slide is returned to its left hand position and the mandrel carrying the master and formed work may be removed to permit the locating of another unit on the support.

By peripherally engaging and rotating the work in such a way as to eliminate the possibility of springing of the work or blank it is possible to take much heavier cuts than where the blank is supported on an arbor or centers and with more accuracy. In this way not only is the forming time reduced, but the grinding operation is reduced all to the end that worms, screws and similar objects may be economically produced.

Having described the invention in the form at present preferred, what it is desired to claim and secure by Letters Patent of the United States is:

1. A machine of the class described comprising in combination, a support, an abutment member thereon for the upper side of the periphery of cylindrical piece of work, carrier members movable towards and away from one another, rolls in the members disposed for rotation on axes below the plane of said abutment adapted to engage the periphery of a cylindrical piece of work at the sides thereof below a horizontal plane passing through the axis of the work and adapted to rotate said work and cooperating with the abutment to maintain the work on a certain axis of rotation, and a tool below the abutment for acting on the periphery of a piece of work at a point opposite to that engaged by said abutment.

2. A machine of the class described comprising in combination, a support, an abutment member thereon for the upper side of the periphery of cylindrical piece of work, carrier members movable towards and away from one another, rolls in the members arranged for rotation on axes below the plane of said abutment disposed to engage the periphery of a cylindrical piece of work at the sides thereof below a horizontal plane passing through the axis of the work and adapted to rotate said work and cooperating with the abutment to maintain the work on a certain axis of rotation, and a tool below the abutment for moving said members towards and away from one another.

3. A machine of the class described comprising in combination, a support, an abutment member thereon for the upper side of the periphery of cylindrical piece of work, carrier members movable towards and away from one another, rolls in the members disposed for rotation on axes below the plane of said abutment adapted to engage the periphery of a cylindrical piece of work at the sides thereof below the portion bearing against said abutment and arranged to rotate said work and cooperating with the abutment to maintain the work on a certain axis of rotation, and means for moving the rolls and work axially whereby the tool traverses the work.

4. A machine of the class described comprising in combination, a support, an abutment member thereon for the upper side of the periphery of cylindrical piece of work, carrier members movable towards and away from one another, rolls in the members disposed for rotation on axes below the plane of said abutment adapted to engage the periphery of a cylindrical piece of work at the sides thereof below the portion bearing against said abutment and arranged to rotate said work and cooperating with the abutment to maintain the work on a certain axis of rotation, and means for moving the rolls and work axially whereby the tool traverses the work, the said means including a member associated with the work carrying a screw in engagement with a nut.

5. A machine of the class described comprising in combination, a support, a slide movable up and down thereon, a pair of carriers movable transversely thereon, work engaging members carried by adjacent sides of the carriers and a work engaging member carried by the support above and between the first-named members, the said members arranged and adapted to engage the top and adjacent sides of the periphery of a cylindrical piece of work to support the same, a tool on said support for acting on the periphery of a piece of work opposite to the top engaged by the second-named engaging member, means to move the carriers, and means to move the slide on the support.

6. A machine of the class described comprising in combination, a support, a slide movable up and down thereon, a pair of carriers movable transversely thereon, work engaging members carried by adjacent sides of the carriers and a work engaging member carried by the support above and between the first-named members, the said members arranged and adapted to engage the top and adjacent sides of the periphery of a cylindrical piece of work to support the same, a tool on said support for acting on the periphery of a piece of work opposite to the top engaged by the second-named engaging member, means to move the carriers, means to move the slide on the support, and means for moving work axially relative to said tool including a member for securing to the work a screw thereon and a nut on the support with which said screw is engaged.

7. A machine of the class described comprising in combination, a support, a slide movable up and down thereon, carriers movable towards and away from one another on said slide, work engaging members on adjacent sides of said carriers and on the support above and between those on the carriers, certain of said members being rotatable whereby the periphery of a cylindrical piece of work may be engaged on the upper and adjacent sides and the work rotated, a rotatable tool on the support opposite the working engaging member at the upper side of the work, means to rotate said rolls, means to operate said carriers, means to operate said slide, and means to feed said work axially relative to said work engaging members and tool.

8. A machine of the class described comprising in combination, a support, a slide movable up and down thereon, carriers movable towards and away from one another on said slide, work engaging members on adjacent sides of said carriers and on the support above and between those on the carriers, certain of said members being rotatable whereby the periphery of a cylindrical piece of work may be engaged on the upper and adjacent sides and the work rotated, a rotatable tool on the support opposite the working engaging member at the upper side of the work, means to rotate said rolls, means to operate said carriers, means to operate said slide, and means to feed said work axially relative to said work engaging members and tool, the said means including a screw for securing to a piece of work and a nut on said support operable as the work is rotated to feed the same.

9. A machine of the class described comprising in combination, a support, a slide movable up and down thereon, carriers slidable transversely thereon, means to move said carriers including yieldable means urging the same in one direction and links for moving the same in an opposite direction, rolls in adjacent ends of said carriers, an abutment on the slide between and above the said rolls, the said rolls and abutment adapted to engage the upper and adjacent sides of the periphery of a cylindrical piece of work to support and rotate the same on a certain axis leaving the lower portion of the periphery free for the action of a tool, means to rotate said rolls, and means to feed a piece of work axially including a member for securing to a piece of work, a screw thereon, and a nut receiving the same which is carried by said support.

10. A machine of the class described comprising in combination, an abutment against which the upper side of a rotating cylindrical piece of work may abut, driving rolls for engaging opposite sides of said work at points below a horizontal plane passing through the axis of said work whereby said work is rotatably driven by said rolls and supported with its upper side against said abutment, means to rotate said rolls, and a tool for acting on said work on its lower side and opposite to the side thereof contacting with said abutment.

11. A machine of the class described comprising in combination, a support, an abutment member thereon for the upper side of the periphery of cylindrical piece of work, carrier members movable towards and away from one another, work rolls in the members disposed for rotation on axes below the plane of said abutment adapted to engage the periphery of a cylindrical piece of work at the sides thereof below the portion bearing against said abutment and arranged to rotate said work and cooperating with the abutment to maintain the work on a certain axis of rotation, other rolls in the members acting on the work rolls at the outer sides thereof, and means for moving the rolls and work axially whereby the tool traverses the work.

12. A machine of the class described comprising in combination, a support, an abutment member thereon for the upper side of the periphery of cylindrical piece of work, carrier members movable towards and away from one another, work rolls in the members disposed for rotation on axes below the plane of said abutment adapted to engage the periphery of a cylindrical piece of work at the sides thereof below the portion bearing against said abutment and arranged to rotate said work and cooperating with the abutment to maintain the work on a certain axis of rotation, other rolls in the members outside the work rolls engaging the same, and means for moving the rolls and work axially whereby the tool traverses the work, the said means including a member associated with the work carrying a screw in engagement with a nut.

13. A machine of the class described comprising in combination, a support, an abutment member thereon for the upper side of the periphery of cylindrical piece of work, carrier members movable towards and away from one another, rolls in the members disposed for rotation on axes below the plane of said abutment adapted to engage the periphery of a cylindrical piece of work at the sides thereof below the portion bearing against said abutment and arranged to rotate said work and cooperating with the abutment to maintain the work on a certain axis of rotation, means for moving the carrier members towards and away from one another, and means for moving the rolls and work axially whereby the tool traverses the work.

14. A machine of the class described comprising in combination, a support, a slide movable up and down on the support between operative and inoperative positions, means on said slide to releasably and rotatably support and drive a cylindrical piece of work, a rotatable tool for acting on a rotating piece of work when the slide is in operative position, a screw member for connecting to a piece of work, and cooperating screw engaging means associated with the slide and support operable to engage said screw when the slide is in operable position.

15. A machine of the class described comprising in combination, a support, a slide thereon movable vertically between operative and inoperative positions, a horizontal slide movable on the vertical slide, means on the horizontal slide to rotate and support a piece of work, a tool for acting on a piece of work when the vertical slide is in operative position, a member for connecting to a piece of work and rotated thereby, a screw associated with said member, cooperating means associated with the vertical slide and support operable to engage said screw when the vertical slide is in operative position to move said member axially, and means associated with the horizontal slide and member whereby the former is moved by the latter.

16. A machine of the class described comprising in combination, a support, carriers movable therein towards and away from one another, an abutment for the upper side of a piece of work on said support, rolls on adjacent inner sides of said carriers for engaging opposite sides of a piece of work, means to move said carriers in one direction, and means for moving said carriers in an opposite direction including, members pivoted to said support having end portions arranged to act on said carriers and other end portions connected to an actuating member movable back and forth on said support.

JULIAN L. PERKINS.